June 13, 1933.                H. D. HOFFMAN                 1,913,594
                              ANIMAL RUNWAY TRAP
                              Filed April 14, 1932
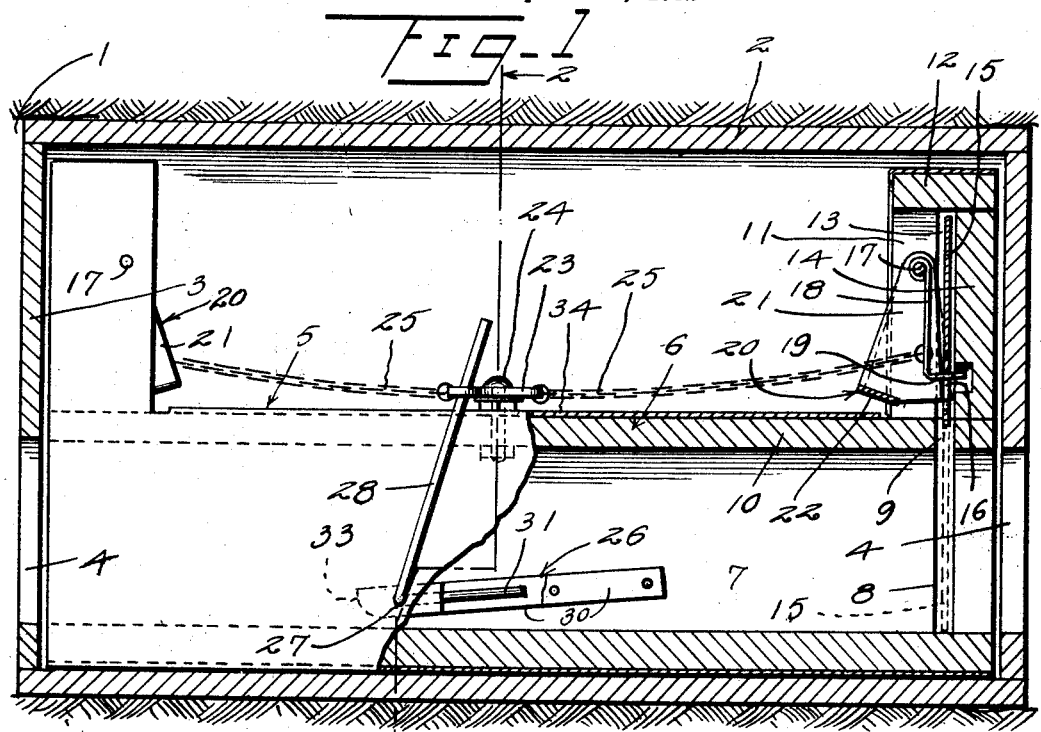
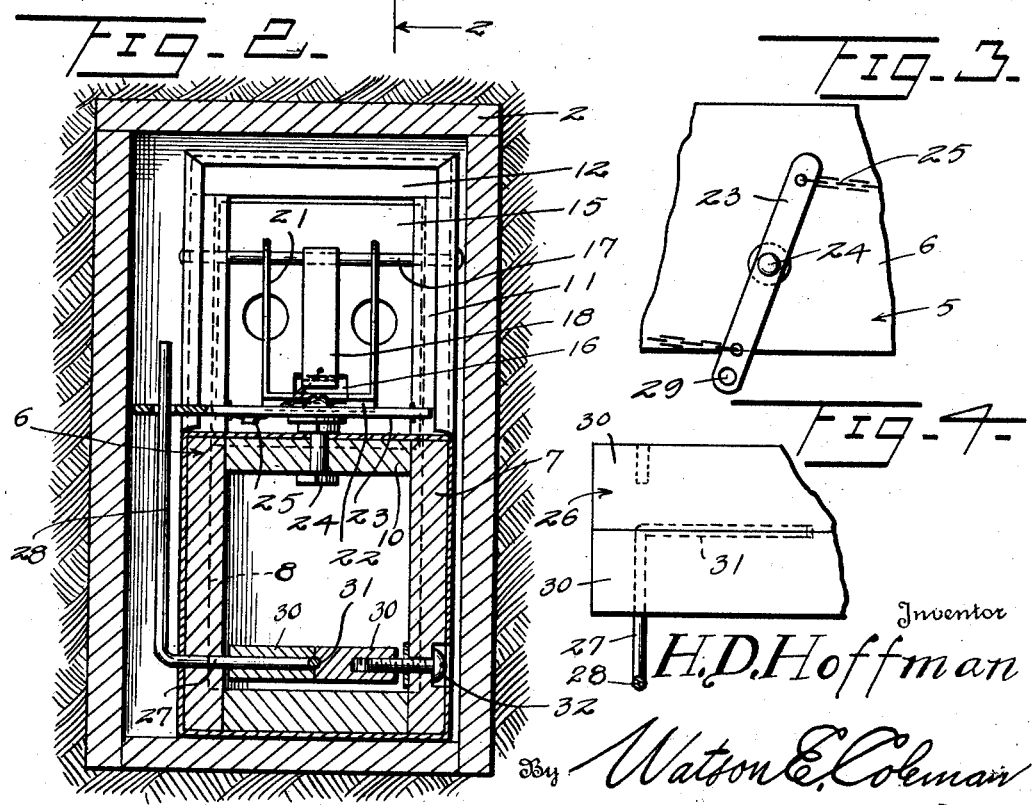
Inventor
H. D. Hoffman
By Watson E. Coleman
        Attorney Patented June 13, 1933

1,913,594

UNITED STATES PATENT OFFICE

HENRY D. HOFFMAN, OF YOUNGSTOWN, PENNSYLVANIA

ANIMAL RUNWAY TRAP

Application filed April 14, 1932. Serial No. 605,290.

This invention relates to improvements in animal traps and pertains particularly to a trap designed to take an animal alive. This protecting casing 2 is placed in the animal runway where it is allowed to remain year after year. The animals thus make use of the casing as a den or a runway and seek the same when chased and hunting for cover.

The primary object of the present invention is to provide a novel type of trap which is designed to be placed in an animal runway or in the mouth of a den, so as to compel the animal to pass through the trap in its passage to or from the den or through the runway.

Another object of the invention is to provide a trap having automatically closing doors which are released by the animal after it enters the trap, so that the animal will be imprisoned and will not be injured in the process of capture.

Another object of the invention is to provide a new and novel means for securing a trap-door against movement after the trap has been sprung and the animal captured, so that the animal will be unable to shift the door and escape.

A still further object of the invention is to provide a new and novel form of treadle over which the animal passes to effect the springing of the trap and a novel means for positioning or centering the treadle in the body of the trap.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1 is a view partially in longitudinal section and partially in elevation of the trap embodying the present invention, showing the same in the protecting housing in association with which it is used and showing the housing positioned in a runway, the housing being entirely in longitudinal section;

Figure 2 is a transverse sectional view taken on the line 2—2 of Figure 1;

Figure 3 is a view in top plan of a portion of the trap showing the trigger shifting mechanism;

Figure 4 is a plan view of the rear portion of the trap treadle, showing a detail of construction.

Referring now more particularly to the drawing wherein like numerals of reference indicate corresponding parts throughout the several views, the numeral 1 indicates a ground passageway in which the trap and its protecting casing is fitted, the protecting casing of the trap being indicated as a whole by the numeral 2. The casing 2 is in the form of an elongated rectangular box having end walls 3 each of which has an entrance opening 4 therethrough which corresponds to an entrance opening of the trap proper which is indicated generally by the numeral 5. One of the walls 3 of the trap housing or casing is removable so as to facilitate the removal of the trap for setting or in order to take out a captured animal without having to remove the housing 2 from its position in the runway.

The trap 5 comprises an elongated rectangular casing or chamber 6, each end of which is open as shown, and at each end the side walls 7 have the vertical trap door guide grooves 8 therein which lead to a slot 9 in the top wall 10. Each open end of the casing 6 is of substantially the same size as the opening 4 in the adjacent end wall of the housing 2 and as shown, the ends of the trap proper are positioned in close proximity to the end walls 3 of the housing so that the animal in passing through an opening 4 must pass into the trap chamber.

At each end of the trap chamber are the upstanding spaced posts 11 which are connected by a top cross piece 12 and the inner faces of these posts 11 have grooves 13 therein which align with the groove 8 in the underlying trap casing wall 7.

Between the posts 11 in front of the grooves 13 is a panel 14 which closes one side of the frame defined by the posts 11 and the top piece 12.

At each end of the trap chamber is a door 15 formed of relatively heavy sheet metal and having a trigger opening 16 therein adjacent its lower edge. Each of these doors 15 has its side edges slidably positioned in the aligned grooves 8—13 so that it may move freely in a vertical path either into the frame or into a position to close the adjacent end of the trap chamber.

Extending across each frame between the side posts 11 thereof is a pin or bar 17 on which is oscillatably supported a trigger hook 18 which has a bill 19 at its free end which is directed toward the adjacent door so as to engage in the trigger opening 16 thereof when the door is raised into the frame.

Also suspended from each of the pins 17 is a door securing or latching element which is indicated as a whole by the numeral 20 and which as shown, is substantially U-shaped and has the side members 21 thereof relatively broad at their lower ends and tapering to their free ends through which tapered free ends the pin 17 passes. As shown, the latch members 20 have the tapered ends of the side portions 21 pivotally mounted relatively close to the doors 15 so that the space between the pivotal centers therefor and the adjacent door is materially less than the width of the side members at their lower ends, which lower ends are connected adjacent the edges remote from the doors by a cross yoke 22.

It will thus be seen that the tendency of the latch members to gravitate to a vertical position on the supporting pins 17 will cause the inner corners of the side portions 21 to normally engage the adjacent bar when the latter is in the raised position shown in Figure 1 and consequently when the door drops and its top edge falls beneath the inner corners of the side portions of the latch elements, these inner corners will swing in to position over the top edge of the door and thus operate to prevent the reverse movement thereof.

Upon the top of the trap chamber 6 there is oscillatably mounted the bar 23 which is held in position by a pin 24 passing therethrough at a point substantially midway between its ends. Each end of this bar 23 has attached thereto one end of a chain 25, the other end of which is connected with a door trigger 18 as shown in Figure 1.

Mounted within the chamber 6 is a treadle 26 over which the animal must pass and which when oscillated operates to release the triggers 18 to effect the simultaneous closing of the doors 15. This treadle 26 has extending from one side edge a shaft 27 which forms a part of a right angularly extended arm 28 which projects upwardly along the outside of the trap chamber 6 above the top thereof, passing through the aperture 29 in an end of the trigger releasing bar 23.

The treadle 26 is formed of two pieces of material each of which is indicated by the numeral 30 and the shaft 27 is held against rotation in the treadle by positioning the angularly extending inner end or crank portion 31 between the abutting edges of the treadle portions 30, as illustrated in Figure 4.

The shaft 27 extends through a suitable aperture in a side wall 7 of the trap chamber and in alignment with this shaft at the opposite side of the treadle there extends through the other side wall, the screw 32, the shank of which enters the body of the treadle, as illustrated in Figure 2. As will be readily apparent the centering of the treadle is easily effected by means of this screw for by turning the screw in the proper direction the treadle may be forced one way or the other in the trap chamber until it is properly positioned therein. The screw and shaft 27 engage the treadle at one end as shown in Figure 1 and this end has its lower corner rounded off as indicated at 33 so that the treadle may be placed relatively closely to the bottom of the trap chamber and oscillate without contacting the same.

From the foregoing description it will be readily apparent that with a trap of the character herein described animals may be easily and quickly taken in their runs or in the entrance to their dens and also they may be captured without injury.

In order to prevent the escape of the animals through them gnawing through the wall of the chamber, the latter is covered exteriorly with a sheet metal body or jacket 34.

Having thus described the invention, what is claimed is:—

1. A trap of the character described comprising a body forming a trap chamber and having an entrance opening, a frame disposed above the chamber adjacent the entrance opening, a door for said opening, guide means for the door within the frame and extending into the trap chamber, a trigger element suspended in said frame and adapted to engage the door to maintain the same in open position, an oscillating member within the trap chamber adapted to be actuated by an animal entering the same and having connection with the trigger for disengaging the same from the door, and an oscillable latch element within the frame for engaging the door when the same has moved in the guide means to closed position to prevent the opening thereof.

2. A trap of the character described comprising an animal receiving chamber having an entrance opening, opposite side walls of the chamber adjacent the entrance opening having vertical grooves therein, a frame above the trap chamber adjacent the entrance opening and including a pair of upright members having vertical grooves in their opposed faces which are aligned with the grooves of the chamber walls, the top of the chamber having a slot therethrough in the same plane as said grooves, a door member comprising a plate having its side edges slidably mounted in said grooves to pass through said slot, a trigger suspended in said frame between the side members thereof and designed to engage the door to retain it in raised position, and trip means within the chamber and connected with the trigger for releasing the door.

3. A trap of the character described comprising an animal receiving chamber having an entrance opening, opposite side walls of the chamber adjacent the entrance opening having vertical grooves therein, a frame above the trap chamber adjacent the entrance opening and including a pair of upright members having vertical grooves in their opposed faces which are aligned with the grooves of the chamber walls, the top of the chamber having a slot therethrough in the same plane as said grooves, a door member comprising a plate having its side edges slidably mounted in said grooves to pass through said slot, a trigger suspended in said frame between the side members thereof and designed to engage the door to retain it in raised position, trip means within the chamber and connected with the trigger for releasing the door, and a gravity actuated latch oscillatably mounted in the frame for engaging the top edge of the door when the latter has dropped to close the entrance opening to the chamber to retain the door in closed position.

4. A trap of the character described comprising a chamber having an entrance opening, a gravity actuated door for closing said opening, means for guiding the door in a vertical path to open or closed position, a swinging latch mounted adjacent the door and actuated by gravity to contact therewith when the door is in open position, the moving of the door to closed position permitting the latch to shift to a stationary suspended position over the top edge of the door to prevent its reverse movement, an oscillatable trigger adapted to engage the door to hold the same in raised position, and animal operated trip means within the trap chamber having connection with the trigger for releasing the latter.

5. A trap comprising a chambered body having an opening, a vertically reciprocable door for said opening, a frame structure carried upon the top of the body adjacent the door, a latch swingingly carried by said structure and adapted to engage and hold the door in open position, a bar member pivotally mounted upon the body for oscillation about a vertical axis, a treadle within the body having connection with said bar to oscillate the same, and a flexible connection between said bar and the latch.

6. In a trap, a chambered body having an entrance opening, a vertically reciprocable bar for closing said opening, means for guiding said door in its reciprocatory movement, a latch element carried by the body to engage and hold the door in opened position, a treadle disposed within the trap body, means pivotally connecting the treadle with adjacent walls of the body, means connected with the treadle to oscillate therewith and having connection with said trigger to shift the same upon oscillation of the treadle, and means whereby lateral shifting of the treadle within the trap may be effected for centering the same.

7. In a trap structure, a chambered body having an entrance opening, a gravity operated door designed to close said opening, a shiftable latch element adapted to hold said door in open position, a treadle disposed within the body, a bar member extending at one edge of said treadle through an adjacent wall of the body and formed exteriorly of the body to form a lever, a pin member engaged in the opposite edge of the treadle and having oscillatable engagement in the adjacent other side wall of the body, said pin and bar constituting the pivot means for the treadle, and means connecting the lever portion of the bar with said trigger for effecting the movement of the latter upon the oscillation of the treadle, said bar further having movement longitudinally through the wall in which it is mounted, and said pin being rotatable in the wall in which it is mounted and having threaded connection with the treadle whereby the position of the treadle may be shifted transversely of the body.

8. In a trap, a chambered body having an entrance opening, a vertically reciprocable door adapted to close said opening, a frame disposed above the body adjacent the door, guide means in the body and the frame for the door, said door having an aperture therein, means for securing said door in closed position comprising an elongated body of substantial width at one end and tapering substantially to a point at its other end, a bar disposed across said frame and extending through the pointed end of the body to oscillatably support the same, said body having an edge in contact with said door when the latter is open and swinging by gravity to a position where its free end edge overlies the top end edge of the door when the latter is closed, a trigger finger oscillatably mounted upon said bar and having a laterally turned end adapted to engage in said door opening to maintain the door in opened position, a trip means operable from the interior of the body for disengaging said trigger finger from the door.

In testimony whereof I hereunto affix my signature.

HENRY D. HOFFMAN.